(12) United States Patent
Bonicatto et al.

(10) Patent No.: US 9,106,365 B1
(45) Date of Patent: Aug. 11, 2015

(54) TIME-KEEPING BETWEEN DEVICES USING POWER DISTRIBUTION LINE COMMUNICATIONS

(75) Inventors: Damian Bonicatto, Pequot Lakes, MN (US); Rolf Flen, Pequot Lakes, MN (US); Stuart L. Haug, Hackensack, MN (US); Chad Wolter, Breezy Point, MN (US); Verne Olson, Pequot Lakes, MN (US)

(73) Assignee: Landis+Gyr Technologies, LLC, Pequot Lakes, MN (US)

( * ) Notice: Subject to any disclaimer, the term of this patent is extended or adjusted under 35 U.S.C. 154(b) by 753 days.

(21) Appl. No.: 13/334,589

(22) Filed: Dec. 22, 2011

(51) Int. Cl.
*G08B 23/00* (2006.01)
*H04L 7/00* (2006.01)

(52) U.S. Cl.
CPC . *H04L 7/00* (2013.01); *G08B 23/00* (2013.01)

(58) Field of Classification Search
CPC ............ H04B 3/00; H04B 3/54; H04B 3/542; H04B 3/546; H04B 1/38; H04L 7/00; H04Q 2209/00; H04Q 2209/60; G08B 1/00; G08B 1/08; G08B 2203/5433; G01D 4/004
USPC ............ 340/870.01, 870.02, 870.03, 870.11; 375/219, 257, 259, 356, 354, 369
See application file for complete search history.

(56) References Cited

U.S. PATENT DOCUMENTS

| | | | |
|---|---|---|---|
| 5,581,229 A | 12/1996 | Hunt | |
| 6,154,488 A | 11/2000 | Hunt | |
| 6,177,884 B1 | 1/2001 | Hunt et al. | |
| 6,998,963 B2 | 2/2006 | Flen et al. | |
| 7,102,490 B2 | 9/2006 | Flen et al. | |
| 7,145,438 B2 | 12/2006 | Flen et al. | |
| 7,180,412 B2 | 2/2007 | Bonicatto et al. | |
| 7,184,861 B2 | 2/2007 | Petite | |
| 7,209,840 B2 | 4/2007 | Petite et al. | |
| 7,224,740 B2 | 5/2007 | Hunt | |
| 7,236,765 B2 | 6/2007 | Bonicatto et al. | |
| 7,346,463 B2 | 3/2008 | Petite et al. | |
| 7,432,824 B2 | 10/2008 | Flen et al. | |
| 7,443,313 B2 | 10/2008 | Davis et al. | |
| 7,468,661 B2 | 12/2008 | Petite et al. | |
| 7,706,320 B2 | 4/2010 | Davis et al. | |
| 7,738,999 B2 | 6/2010 | Petite | |
| 7,742,393 B2 | 6/2010 | Bonicatto et al. | |
| 7,774,530 B2 | 8/2010 | Haug et al. | |
| 7,791,468 B2 | 9/2010 | Bonicatto et al. | |
| 7,877,218 B2 | 1/2011 | Bonicatto et al. | |
| 7,978,059 B2 | 7/2011 | Petite et al. | |

(Continued)

*Primary Examiner* — Hung T Nguyen
(74) *Attorney, Agent, or Firm* — Crawford Maunu PLLC (57) ABSTRACT

Particular embodiments are directed towards a method for communicating time-based data in a power line communication system. The communication system utilized in the method includes: a command center; a collector device; and a plurality of endpoint devices. The method includes communicating, from the collector device, downstream data to the plurality of endpoint devices. This downstream communication utilizes a communication protocol that is relative to a collector network time, and is over a set of power distribution lines carrying alternating current (AC). The collector network time uses the local oscillator. The AC zero-crossing event can be used as a time base for other versions of the network time. Conceptually, the AC can be thought of as acting as a reference clock for maintaining these other network times, although the clocking function can be carried out in the digital realm, e.g., using a digital-signal processor (DSP).

20 Claims, 5 Drawing Sheets

(56) References Cited

U.S. PATENT DOCUMENTS

| | | |
|---|---|---|
| 8,144,816 B2 | 3/2012 | Bonicatto et al. |
| 8,144,820 B2 | 3/2012 | Bonicatto |
| 8,194,789 B2 | 6/2012 | Wolter et al. |
| 8,238,263 B2 | 8/2012 | Kohout et al. |
| 8,693,605 B2 * | 4/2014 | Wolter et al. ............. 375/356 |
| 2005/0179561 A1 * | 8/2005 | Osterloh et al. ........ 340/870.02 |
| 2008/0304595 A1 | 12/2008 | Haug et al. |
| 2010/0188938 A1 * | 7/2010 | Johnson et al. ............ 368/47 |
| 2010/0265096 A1 * | 10/2010 | Cornwall et al. ........ 340/870.02 |
| 2011/0121952 A1 | 5/2011 | Bonicatto et al. |
| 2011/0176598 A1 | 7/2011 | Kohout et al. |
| 2011/0218686 A1 | 9/2011 | McHann, Jr. et al. |
| 2011/0249678 A1 | 10/2011 | Bonicatto et al. |
| 2012/0057592 A1 | 3/2012 | Zeppetelle et al. |
| 2012/0076212 A1 | 3/2012 | Zeppetelle et al. |
| 2012/0084559 A1 | 4/2012 | Bonicatto |
| 2012/0106664 A1 | 5/2012 | Bonicatto et al. |
| 2013/0163682 A1 * | 6/2013 | Glende ..................... 375/257 |

* cited by examiner

TIME-KEEPING BETWEEN DEVICES USING POWER DISTRIBUTION LINE COMMUNICATIONS

BACKGROUND

Service providers utilize distributed networks to provide services to customers over large geographic areas. For example, power companies use power distribution lines to carry power from one or more generating stations (power plants) to residential and commercial customer sites alike. The generating stations use alternating current (AC) to transmit power over long distances via the power distribution lines. Long-distance transmission can be accomplished using a relatively high voltage. Substations located near the customer sites provide a step-down from the high voltage to a lower voltage (e.g., using transformers). Power distribution lines carry this lower-voltage AC from the substations to the endpoint devices at customer sites.

Communications providers may utilize a distributed communications network to provide communications services to customers. Similarly, power companies utilize a network of power lines, meters, and other network elements to provide power to customers throughout a geographic region and to receive data from the customer locations (e.g., including but not limited to data representing metered utility data about the power usage). A system can provide these reporting functions using a set of data-collecting devices (collectors) that are designed to communicate with nearby endpoint devices. However, data communication between a command center, collectors and many thousands of endpoint devices over power distribution lines can be a particularly challenging issue. The sheer number of endpoint devices contributes to a host of issues including synchronization, communication bandwidth and cost concerns. Other problems relate to signal interference and coordination between communicating devices. These and other issues relate to the coordination of communications, and related time-keeping efforts, in such a system.

SUMMARY

The present disclosure is directed to systems and methods for use with coordinated communications between devices and over power distribution lines. These and other aspects of the present disclosure are exemplified in a number of illustrated implementations and applications, some of which are shown in the figures and characterized in the claims section that follows.

Particular embodiments of the instant disclosure are directed towards a method for communicating time-based data in a power line communication system. The communication system utilized in the method includes: a command center; a collector device; and a plurality of endpoint devices. The method includes communicating, from the collector device, downstream data to a plurality of endpoint devices. This downstream communication utilizes a communication protocol that is relative to a collector network time, and is over a set of power distribution lines carrying alternating current (AC). Further, the collector network time uses a local (crystal) oscillator as a time base. In some instances, the AC zero-crossing event can be used as a time base for other version of the network time (e.g., endpoint network time or DSP network time). Conceptually, the AC can be thought of as acting as a reference clock for maintaining these other network times, although the clocking function can be carried out in the digital realm, e.g., using a digital-signal processor (DSP).

Consistent with certain embodiments, a method can be implemented that includes the communication of upstream data from each endpoint device to the collector device. This upstream communication uses a communication protocol that is relative to a corresponding endpoint network time (using the AC as a time base), and is over the set of power distribution lines carrying alternating current (AC). The upstream data, utilized in the method of the instant embodiment, is further described in that it is time-sensitive relative to a location-based time. The location-based time is dependent on the physical or geographic location of the endpoint device and uses the AC as a time base. This location-based time is different than the endpoint network time (e.g., due to time zone or other time-offsets). The method further operates by adjusting and synchronizing the collector network time and the endpoint network time according to a network time derived from a time server. The synchronization can be helpful for facilitating system-wide downstream data communication over the set of power distribution lines and for tracking the time-based events (via upstream data communication over the set of power distribution lines) that have been reported relative to the location-based times used by the endpoint devices.

Embodiments of the present disclosure are also directed towards various systems that can be useful for utility usage metering/reporting. Consistent with various other embodiments, the instant disclosure describes a utility reporting system, which includes a plurality of endpoints. The endpoints can be designed for a number of purposes. For instance, endpoints can be configured and arranged to maintain local metrological time, in response to timing data received over power distribution lines. The local metrological time can be maintained by adjusting a local clock signal and by adding timing offsets for time zones, daylight savings, or both time zones and daylight savings. Additionally, each endpoint can be configured and arranged to receive utility usage data from utility meters, and tag the utility usage data with the local metrological time. Data other than utility usage data can also be generated and/or received by the endpoint devices. For instance, billing data relating to time of use rates can be generated by the endpoint devices. Further, the endpoints maintain an endpoint network time using a frequency of the AC power carried on the power distribution lines as a timing reference.

Consistent with certain embodiments, each endpoint can transmit the tagged utility usage data over the power distribution lines. The endpoints utilize the endpoint network time as a reference for timing the transmission of data carrying symbols of the tagged utility usage data. In addition to the plurality of endpoints, this utility reporting system includes a collector having a plurality of blades. Each of these blades are configured and arranged for a number of functions. For instance, each blade is designed to maintain a DSP network time using a timing reference (a frequency of the AC power carried on the power distribution lines). Additionally, the collector can include a control circuit (e.g., a single-board computer (SBC) circuit) that is configured to adjust the collector network time in response to timing data received from a time server. This control circuit can provide the collector network time to each of the blades in order to maintain a synchronous network time at the blades. Further, each blade is designed to transmit and/or receive information over the power distribution lines. The blades transmit the maintained network time to one or more of the endpoints, and receive the data from the endpoints. The received data can be modulated using data carrying symbols. Moreover, each blade can demodulate the received data using the collector network time as a reference for the identification of data carrying symbols.

Various embodiments of the instant disclosure are also directed towards a method, which includes receiving a signal carried on a power distribution line. In certain embodiments, the power distribution line provides alternating current (AC) power. The method continues by decoding the signal to generate data, and extracting time-of-day information from the generated data. The method further includes, in response to detecting a start symbol in the signal, setting a network time to a time corresponding to the extracted time-of-day information. This method can, in certain instances, include an additional action of detecting the presence of a daylight savings flag in the extracted time of day, and generate time data by adding an offset to the network time in response to detecting the presence.

Embodiments of the instant disclosure relate to a device that includes a transceiver circuit and a processing circuit. The transceiver circuit is configured and arranged to receive and transmit signals carried over a power distribution line. The processing circuit is designed for a number of purposes, including the receipt of a signal carried over the power distribution line. The processing circuit is additionally configured and arranged to decode the signal to generate data, and extract time-of-day information from that data. Additionally, the processing circuit can be configured to set, in response to detecting a start symbol in the signal, a network time to a time indicated by the extracted time-of-day.

The above summary is not intended to describe each illustrated embodiment or every implementation of the present disclosure. The figures and detailed description that follow, including that described in the appended claims, more particularly describe some of these embodiments.

BRIEF DESCRIPTION OF FIGURES

Various example embodiments may be more completely understood in consideration of the following detailed description in connection with the accompanying drawings, in which.

While the disclosure is amenable to various modifications and alternative forms, examples thereof have been shown by way of example in the drawings and will be described in detail. It should be understood, however, that the intention is not to limit the disclosure to the particular embodiments shown and/or described. On the contrary, the intention is to cover all modifications, equivalents, and alternatives falling within the spirit and scope of the disclosure.

DETAILED DESCRIPTION

Aspects of the present invention are believed to be applicable to a variety of different types of devices, systems and arrangements for coordinating time-keeping between devices that coordinate communications occurring over power distribution lines. While the present disclosure is not necessarily limited to such applications, various aspects of the disclosure may be appreciated through a discussion of various examples using this context.

A particular use of power line communications relates to utility meter reading applications. In utility meter reading applications (as well as other applications), there can be millions of endpoint devices providing coordinated readings. Utility meter readings might be obtained from physical locations, which can span multiple time zones and/or be subject to different regional time-keeping plans. For utility usage reporting and associated billing functions, having each endpoint report usage according to the correct and accurate time can be a difficult proposition. Moreover, the communications protocols between the different layers of communications devices may require time-based coordination between devices. Aspects of the present disclosure, although not necessarily limited to the above characterizations and problems, are directed toward the coordination of time bases between different devices and for different purposes, including communication protocols.

Particular embodiments of the instant disclosure are directed towards a method for communicating time-based data in a power line communication system. The communication system utilized in the method includes: a command center; a collector device; and a plurality of endpoint devices. The method includes communicating, from the collector device, downstream data to a plurality of endpoint devices. This downstream communication utilizes a communication protocol that is relative to a collector network time, and is over a set of power distribution lines carrying alternating current (AC). Further, the collector network time uses a local (crystal) oscillator as a time base. In some instances, the AC zero-crossing event can be used as a time base for other versions of network time (e.g., endpoint network time or DSP network time). Conceptually, the AC can be thought of as acting as a reference clock for maintaining these other network times, although the clocking function can be carried out in the digital realm, e.g., using a digital-signal processor (DSP).

As used herein, a particular time (e.g., collector network time), which is kept by one or more devices, can be represented by the output of a counter that is driven according to a time base. The time base can be provided using a source of oscillation (e.g., a clock signal provided by a local oscillator circuit or AC carried on power distribution lines). The frequency at which the time base operates provides a timescale for the counter and thereby the particular time.

Consistent with certain embodiments, a method can be implemented that includes the communication of upstream data from each endpoint device to the collector device. This upstream communication uses a communication protocol that is relative to a corresponding endpoint network time (using the AC as a time base), and is over the set of power distribution lines carrying alternating current (AC). The upstream data, utilized in the method of the instant embodiment, is further described in that it is time-sensitive relative to a location-based time. The location-based time is dependent on the geographic location of the endpoint device and uses the AC as a time base. This location-based time is different than the endpoint network time (e.g., due to time zone or other time-offsets). The method further operates by adjusting and synchronizing the collector network time and the endpoint network time according to a network time that is derived from a time server. The synchronization can be helpful for facilitating system-wide downstream data communication over the set of power distribution lines and for tracking the time-based events (via upstream data communication over the set of power distribution lines) that have been reported relative to the location-based times used by the endpoint devices.

In certain specific embodiments, the communications protocols for each of the downstream data and upstream data use symbol transmission intervals that are adjusted and synchronized relative to a corresponding network time.

In embodiments of the present disclosure, the network time is synchronized to a standardized time (e.g., time from a Coordinated Universal Time (UTC) server). The location-based time is synchronized relative to the standardized time as a function of geographic location of a corresponding endpoint device. In some instances, the network time can be synchronized to a standardized time while offsetting the location-based time relative to the standardized time as a function of time zones and regional time-keeping plans associated with a corresponding endpoint device.

This method of communicating time-based data can include the additional step of maintaining synchronicity between the collector network time and the endpoint network time to within a threshold level (e.g., under 150 milliseconds).

In certain embodiments, the communication protocol for the downstream data utilizes quadrature phase-shift keying. Other embodiments relate to the use of different protocols including, but not limited to, differential phase-shift keying, amplitude-shift keying and frequency-shift keying. The communication protocols for both the downstream data and the upstream data can be communicated using the respective network time as a timing reference. In other embodiments of the method of communicating time-based data, additional steps can be included. For instance, certain embodiments include a step of performing offset compensation between endpoint network time and location-based time (at one or more of the endpoints), and therefrom communicating with the collector device using endpoint network time as a timing reference and communicating with one or more utility meters using the location-based time as a timing reference.

Additional aspects of the instant disclosure are directed towards a utility reporting system and methods of using the system. In this system, synchronicity is maintained between each of a plurality of endpoint devices and a plurality of collectors by maintaining synchronicity for a network time and a metrological time. The network time uses the AC power carried over power distribution lines as a time reference. The metrological time also uses the AC power carried over power distribution lines as a time reference. Further, for one or more of the endpoint devices, the metrological time is offset from the network time by one or more of daylight savings time and a time zone. Consistent with certain embodiments, the utility report system is used to communicate meter usage data over the power distribution lines using a communication protocol that utilizes the network time as a timing reference point for the transmission of the meter usage data. Metrological time is used to associate billing data with the meter usage data.

As used herein, the term metrology/metrological time denotes a clock that keeps a time of day. Such a clock would therefore be based upon a timescale that is designed around the time of one rotation of the Earth. Such a design can include compensation for mismatches between the (slowing) rotation of the Earth and a particular timescale. For instance, the International Bureau of Weights and Measures (BIPM) is responsible for maintaining accurate worldwide time of day. It combines, analyzes, and averages the official atomic time standards of member nations around the world to create a single, official Coordinated Universal Time (UTC). While aspects of the present disclosure are not necessarily reliant upon the specific governing body that maintains such a metrological time, a particular example thereof can be useful in discussing various aspects of the present disclosure.

In other embodiments of the present disclosure, the utility reporting system can be used in connection with various additional steps. For instance, broadcast time packets can be transmitted from a collector to multiple endpoint devices. In certain specific embodiments, the end of the last symbol of the time packet indicates the synchronization point for the time indicated in the time packet. For example, the data in the time packet could specify 12:32:03 PM. The transmission would be scheduled for transmission on the power distribution line such that the end of last data symbol of the packet (which might correspond to the start of the next data symbol and packet) would occur at 12:32:03 PM. In other examples, the time packet could specify the time without transmitting data about the seconds (e.g., using an assumption that the seconds are zero or a predetermined amount).

In another embodiment, network times can be synchronized between multiple collectors. The step of synchronizing network times operates by receiving synchronization information from a common time server. Other specific embodiments are directed toward each of the endpoints maintaining a local system time by utilizing a respective oscillator circuit as a time reference. In yet another embodiment, synchronicity can be maintained between the metrological time of an endpoint of the plurality of endpoints and a metrological time of a utility meter. The metrological time of the utility meter is adjusted in response to a time difference exceeding a threshold time.

In addition to the method described above, the disclosure is also directed towards various systems that can be useful for utility usage metering/reporting. Consistent with various other embodiments, the instant disclosure describes a utility reporting system, which includes a plurality of endpoints. The endpoints can be designed for a number of purposes. For instance, endpoints can be configured and arranged to maintain local metrological time, in response to timing data received over power distribution lines. The local metrological time can be maintained by adjusting a local clock signal and by adding timing offsets for time zones, daylight savings, or both time zones and daylight savings. Additionally, each endpoint can be configured and arranged to receive utility usage data from utility meters, and tag the utility usage data with the local metrological time. Further, the endpoints maintain an endpoint network time using AC power carried on the power distribution lines as a timing reference.

Each endpoint can also transmit the tagged utility usage data over the power distribution lines. The endpoints utilize the endpoint network time as a reference for timing the transmission of data carrying symbols of the tagged utility usage data. In addition to the plurality of endpoints, this utility reporting system additionally includes a collector having a plurality of blades. Each of these blades are configured and arranged for a number of functions. For instance, each blade is designed to maintain a DSP network time using a timing reference (AC power carried on the power distribution lines). Further, each blade is designed to transmit and/or receive information over the power distribution lines. The blades transmit the maintained network time to one or more of the endpoints, and receive data from the endpoints. Moreover, each blade can function to demodulate the received data using the collector network time as a reference for identifying data carrying symbols.

The instant disclosure is also directed towards a method, which includes receiving a signal carried on a power distribution line. In certain embodiments, the power distribution line provides alternating current (AC) power. The method continues by decoding the signal to generate data, and extracting time-of-day information from the generated data. The method further includes, in response to detecting a start symbol in the signal, setting a network time to a time corresponding to the extracted time-of-day information. This method can, in certain instances, include an additional action of detecting the presence of a daylight savings flag in the extracted time of day, and generating time data by adding an offset to the network time in response to detecting the presence.

In the instant disclosure, a device, such as an endpoint device, can include a transceiver circuit and a processing circuit. The transceiver circuit is configured and arranged to receive and transmit signals carried over a power distribution line. The processing circuit is designed for a number of purposes, including the receipt of a signal carried over the power distribution line. The processing circuit is additionally configured and arranged to decode the signal to generate data, and extract time-of-day information from that data. Additionally, the processing circuit can be configured to set, in response to detecting a start symbol in the signal, a network time to a time indicated by the extracted time-of-day.

Figure 1:
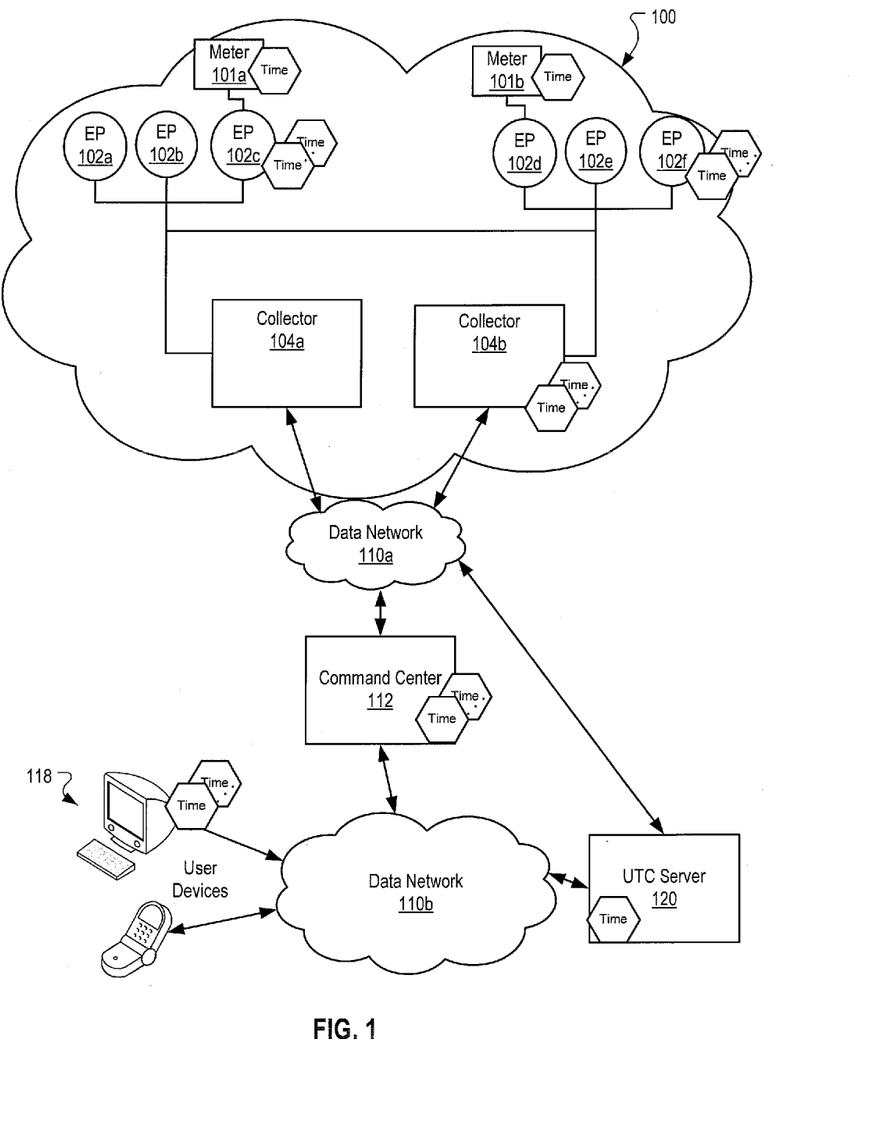
FIG. 1 depicts a block diagram of a network environment in which multiple levels of devices communicate using multiple different times, consistent with embodiments of the present disclosure.

FIG. 1 depicts a block diagram of network environment 100 in which multiple levels of devices communicate using multiple different times, consistent with embodiments of the present disclosure. In FIG. 1, endpoints 102a-102c and 102d-102f transmit symbols over communications channels to collector units 104a, 104b, respectively. The collector units 104 can include circuitry (e.g., including one or more data processors) that is configured and arranged to communicate with the endpoints over power distribution lines. The collector units 104 can also include circuitry for interfacing with a network command center 112. The interface to the command center 112 can be implemented using a variety of different communication networks including, but not limited to, a wide-area network (WAN) using Ethernet.

According to certain embodiments of the present disclosure, the collectors are installed in substations and used to control bidirectional communication with both the command center 112 (e.g., located at a utility office) and endpoints (e.g., located at metering locations for customer sites). This messaging to the endpoints can be sent to an individual endpoint, or broadcast simultaneously to a group of endpoints or even sent to all endpoints connected to the collectors 104. Consistent with certain embodiments, the collectors 104 are built according to an industrial-grade computer specification in order to withstand the harsh environment of a substation.

In certain embodiments of the present disclosure, the collector(s) 104 can receive data from many different endpoints 102 while storing the data in a local database. A collector can also take action based on the data received from the endpoints and transmit data received from the endpoints to a command center 112. For example, in a PLC network, the command center 112 can receive data indicating that power usage is significantly higher in a particular portion of a power network than in other portions of the power network. Based on this data, the command center 112 can allocate additional resources to that particular portion of the network (i.e., load balance) or provide data specifying that there is increased power usage in the particular portion of the power network.

Consistent with certain embodiments, the command center 112 provides an interface that allows user devices 118 access to data received from endpoints 102. For example, the user devices might be owned by a utility provider operator, maintenance personnel and/or customers of the utility provider. For example, data identifying the increased power usage described above can be provided to a user device 118 accessible by the network operator, who can, in turn, determine an appropriate action regarding the increased usage. Additionally, data identifying a time-of-use measure and/or a peak demand measure can also be provided to user devices 118. Similarly, if there has been a power outage, the command center 112 can provide data to user devices 118 that are accessible by customers to provide information regarding the existence of the outage and potentially provide information estimating the duration of the outage.

The data networks 110a and 110b can each be a wide area network (WAN), local area network (LAN), the Internet, or any other communications network. The data network 110 can be implemented as a wired or wireless network. Wired networks can include any media-constrained networks including, but not limited to, networks implemented using metallic wire conductors, fiber optic materials, or waveguides. Wireless networks include all free-space propagation networks including, but not limited to, networks implemented using radio wave and free-space optical networks. In certain embodiments, the data networks 110 overlap with each other. In some embodiments, they can be the same data network. For instance, each network 110 could provide data, at least in part, over the Internet.

Symbols from a particular endpoint may be transmitted over any one of thousands of communications channels in a PLC system. For example, each endpoint can be assigned a particular channel using OFDMA or another channel allocation technique. Channel assignments for the endpoints 102a-102c, 102d-102f that communicate with particular collectors 104a, 104b can be stored, for example, in a communications data store that is accessible to the command center 112 and/or the collectors 104a, 104b.

Consistent with embodiments of the present disclosure, each collector 104 can be configured to be in communication with thousands of endpoints 102 and there can be thousands of collectors 104 in connection with the command center 112. Thus, there can be millions of total endpoints and thousands can share communications bandwidth on a common power distribution line. Accordingly, embodiments of the present disclosure are directed toward coordinating communications using carefully designed time-based protocols and related considerations.

As depicted in FIG. 1, the various devices can each have multiple times. These times can use different time bases, different relative offsets and/or respective counters. Some of these times can be used for reporting purposes (e.g., meter usage reporting, power outage reporting, etc.). Others of the times can be used as part of a communications protocol. Coordination between times is often desirable or even required. It has been discovered that for certain configurations, the communicating devices should maintain synchronicity of approximately 150 milliseconds with respect to the time used for coding transmissions carried over the power distribution lines.

According to various embodiments of the present disclosure, synchronicity of a network time and a metrological time are maintained between the endpoint devices 102a-102f and the collectors 104a-104b. Relative to communications between the devices, the network time can use the frequency of the AC power carried over power distribution lines as a time reference. The metrological time uses the AC power carried over power distribution lines as a time reference.

The synchronicity of the network time and the metrological time is further described with reference first to the endpoints 102a-102f and collectors 104a-104b. For instance, the endpoints 102a-102f are configured and arranged to maintain local metrological time by adjusting a local clock signal and by adding timing offsets for time zones, daylight savings, or both time zones and daylight savings. This adjustment is responsive to timing data received over power distribution lines. In certain embodiments, the network time can be maintained at each of the endpoints 102a-102f using a respective oscillator circuit as a time reference. Further, each endpoint, 102a for example, can be configured and arranged to receive utility usage data from utility meters 101a-101b, and tag the utility usage data with the local metrological time. In certain embodiments, the metrological time of the utility meter 101a-101b is adjusted in response to a time difference exceeding a threshold time. The endpoints 102a-102f are configured to maintain an endpoint network time using AC power carried on the power distribution lines as a timing reference. Each endpoint 102a-102f can also be configured to transmit the tagged utility usage data over the power distribution lines. The endpoints 102a-102f then utilize the endpoint network time as a reference for timing the transmission of data carrying symbols of the tagged utility usage data.

In addition to the plurality of endpoints 102a-102f, FIG. 1 also shows a plurality of collectors 104a-104b (each having a plurality of blades). The blades of the collectors 104a-104b are configured and arranged for a number of functions in order to maintain synchronicity with the endpoints 102a-102f. For instance, the blades of the collectors 104a-104b are configured and arranged to maintain a DSP network time using AC power carried on the power distribution lines as a timing reference. Additionally, the blades of the collectors 104a-104b can be designed, in certain embodiments, to adjust the collector network time in response to timing data received from a time server. This time server can be an external time server, which can be provided by a standard setting body or it can be part of the command center 112. The blades of collectors 104a-104b transmit the maintained network time over the power distribution lines and to one or more of the endpoints. The blades are also configured to receive the data over the same power distribution lines. Moreover, each blade of the collectors 104a-104b can be configured to decode the received data using the collector network time as a reference for identifying the data carrying symbols.

In certain specific embodiments, time packets can be transmitted between a collector, 104a for example, to one or more of endpoint devices, 102a for example. The end of the last symbol of the time packet, in this type of embodiment, indicates a time corresponding to data in the time packet. This end of the last symbol can also be referred to as the start symbol because it can coincide with the start of the first/start symbol for the next packet.

Consistent with embodiments of the present disclosure, the basis for the metrological time is derived from a time provided from a governing body that maintains and provides access to a standardized time. For instance, a UTC Server 120 can be accessed and used as a reference point for the network and metrological times. For instance, collector devices 104 can obtain this time by directly accessing a UTC server 120 over the Internet. In other instances, the command center 112 can access the UTC server. The command center can then provide its own UTC server, which provides UTC time information to the collectors.

According to specific embodiments of the present disclosure, each of the various components of the system depicted in FIG. 1 includes one or more times and these times have respective (and sometimes different) time bases. Moreover, these times have various synchronization restraints based upon their respective uses. FIGS. 2A-2D depict relationships between some of these times and their time-bases in time-based block diagrams.

Consistent with certain embodiments of the present disclosure, a network time is used as the basis for communications between endpoints and collectors. The network time is maintained across all collectors and endpoints associated to the same utility company/command center. Each device maintains a local version of the network time, where the local version can drift within an acceptable tolerance.

The endpoints can be configured to use its local version of the network clock for timing of upstream transmissions. For instance, the endpoint can use the local version to time symbol/modulation of outgoing transmission on the power distribution lines. The collector will use its local version of the network clock to demodulate bits received from the endpoint.

Embodiments of the present disclosure are directed toward synchronization of the local versions of the network clocks between collector and endpoints using downstream time packets that contain current network time for the following minute. The collector aligns the end of the last symbol of the time packet, or the start of the next symbol, so that it commences at the time corresponding to the time provided in the time packet. For instance, the time packet could indicate a network time of 1:30:00, the collector would then transmit last symbol so that the end of the symbol is transmitted at the top of the minute for 1:30, relative to the collector's local version of the network time.

Figure 2A:
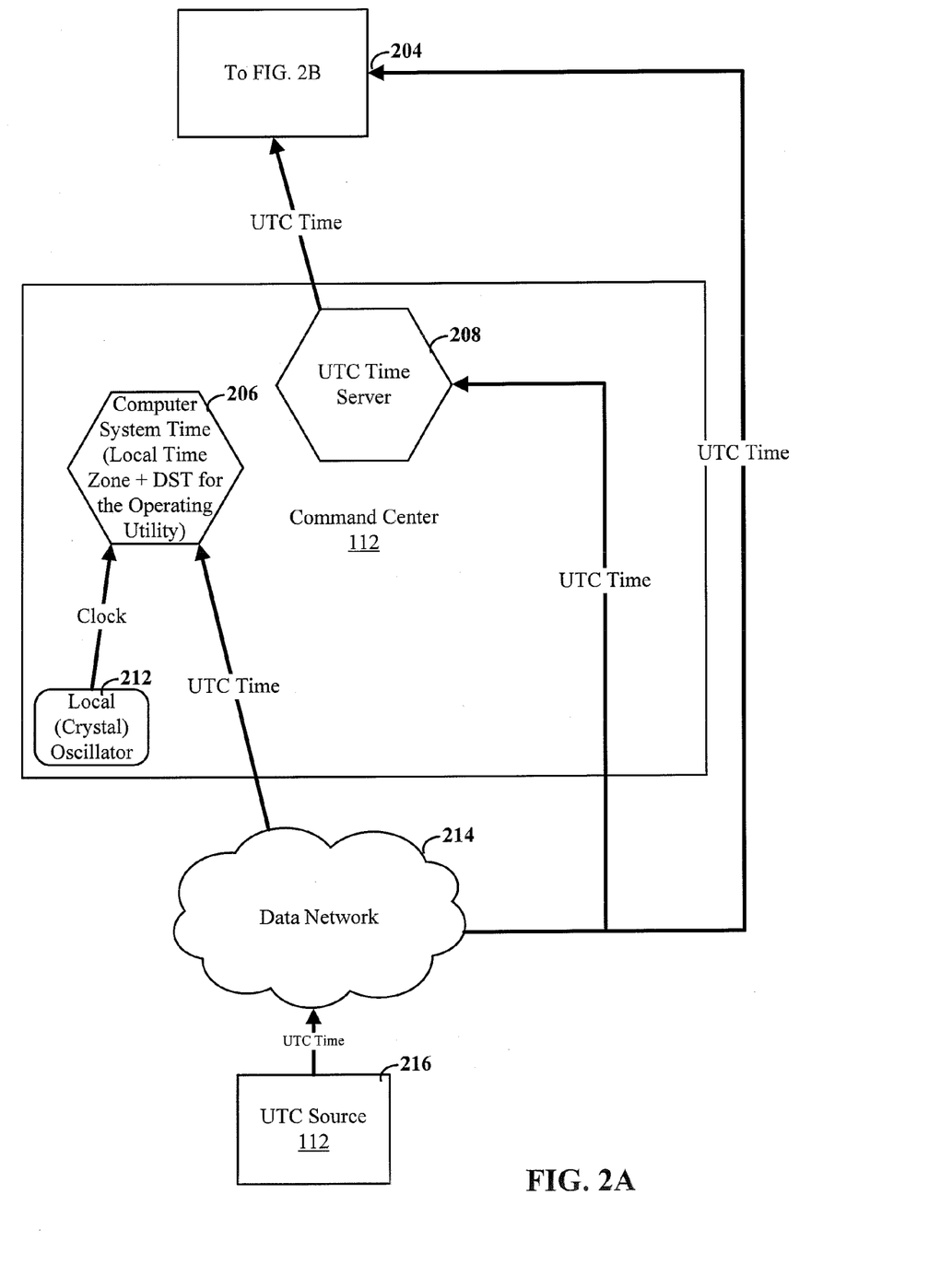
FIG. 2A depicts a time-based block diagram for a command center in the system, consistent with embodiments of the present disclosure.

FIG. 2A depicts a time-based block diagram for a command center in the system, consistent with embodiments of the present disclosure. The command center 112 has a computer system time 206 that uses a local oscillator 212 as its time base. In certain embodiments, the local oscillator 212 can be a crystal oscillator circuit. For instance, command center 112 can be implemented using a computer server that has one or more computer processing circuits (e.g., one or more computer processors configured with specialized software instructions).

Consistent with embodiments of the present disclosure, respective command centers 112 can be setup by different utility companies. Each utility company can deploy a set of collectors and endpoints. These collectors and endpoints would then be configured to communicate with the respective command center 112. In certain embodiments, the collectors can directly access the UTC source 216. In other embodiments, the command center can provide a separate UTC time server 208. Each time server 208 can be set to a time relative to the controlling utility company. For instance, a utility company may decide to set the time server 208 to use a time zone and daylight savings according to the geographic location of the head office of the utility company or to the geographic location of power generation plant serving the customers of the utility company. In certain embodiments, the head office and the location of the command center might be different. The system can be configured to provide an additional (time zone or DST) offset relative to the time at the command center location. Based upon the configuration, each time server 208 provides a respective time for the rest of the system.

Consistent with embodiments of the present disclosure, the computer system time 206 uses a local oscillator as a time base (e.g., as a clock), while maintaining synchronicity with a standardized time. For instance, the source of the standardized time can be a UTC source 216 that is operated by a standard setting body and/or a governmental body. This standardized time can be accessed over a network 214, such as the Internet. The UTC time is then adjusted for a local time zone and, if applicable, daylight savings time (DST). Thus, the computer system time 206 is a locally maintained UTC time with appropriate offset and with synchronization corrections based upon the external UTC source 216. The UTC time server 208 is configured to provide the locally maintained UTC time to downstream components of FIG. 2B, as shown by block 204.

Various embodiments of the present disclosure are directed toward maintaining synchronicity with a standardized time in order to generate a common network time that can be used throughout the system for communications purposes. Particular embodiments recognize that the common network time at each different device can be allowed to drift within a certain tolerance. This tolerance can be different for different devices and even different for different uses within the devices. For instance, the computer system time 206 can be implemented to allow a large tolerance between the network time and the UTC time provided by UTC source 216. The common network time between devices downstream from the UTC time server 208, however, can have a tighter tolerance with respect to one or more of those devices.

Figure 2B:
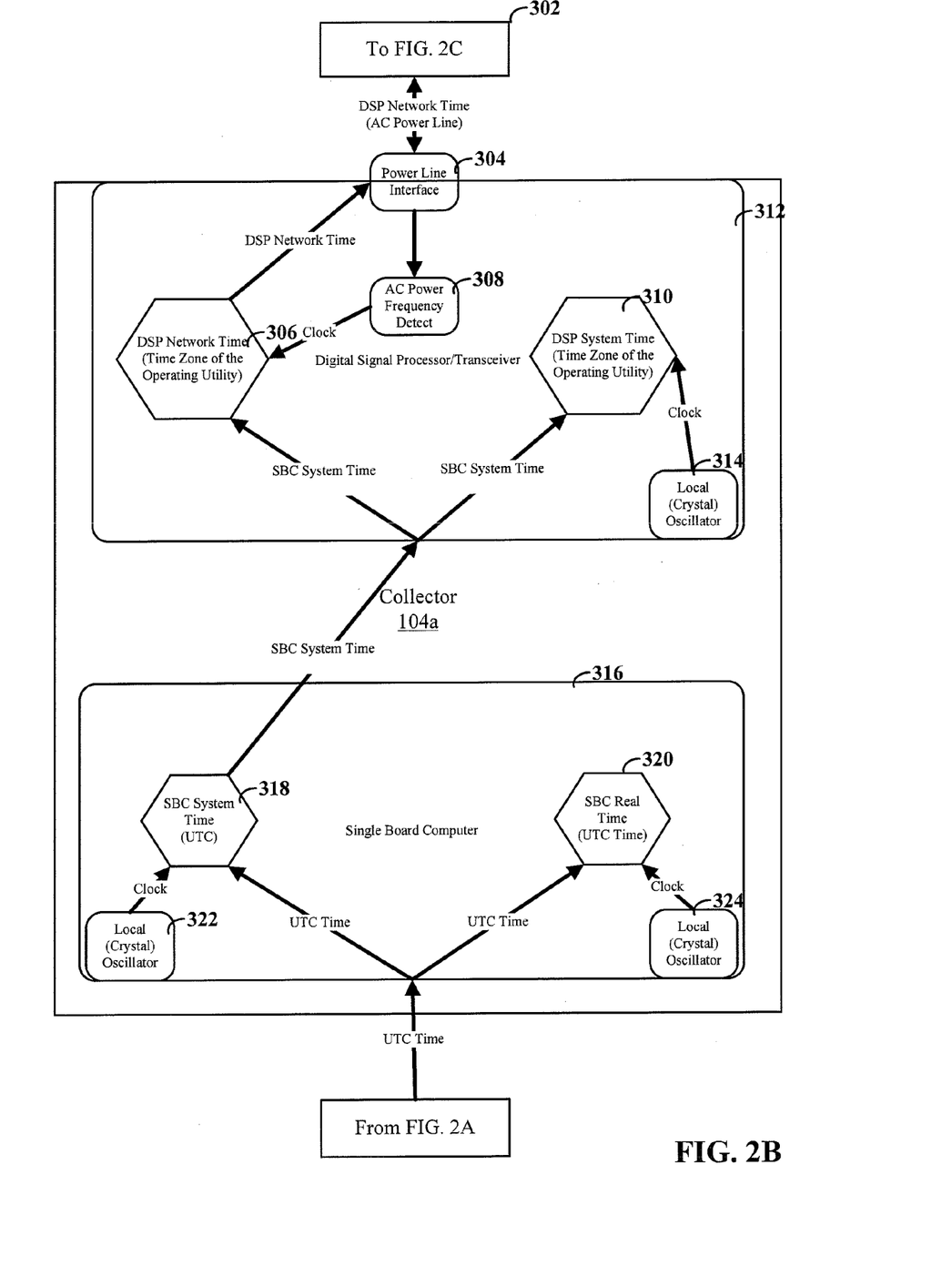
FIG. 2B depicts a time-based block diagram for a collector in the system, consistent with embodiments of the present disclosure.

FIG. 2B depicts a time-based block diagram for a collector in the system, consistent with embodiments of the present disclosure. The collector 104a receives the UTC time from the command center 112. This received UTC time represents a common network time that can be used throughout the system. In the particular embodiment depicted by FIG. 2B, the collector 104a includes two main components. The first component is a single board computer (SBC) 316 and the second component is a digital signal processor (DSP)/transceiver 312. As discussed herein, the single board computer can be linked to the command center 112 through any of a number of different connection and network options. The DSP 312 is linked to downstream endpoints over one or more power distribution lines, as shown by block 302. In various embodiments, a single SBC 316 can control communications to and from multiple DSP 312s. Moreover, a single collector 104a could have multiple SBC 316s.

The DSP 312 interfaces with the power lines using a power line interface 304 for communicatively coupling the DSP 312 to the power distribution lines. Power line interface 304 can be configured and arranged to provide protection from the high voltages on the power distribution lines and also to filter out unwanted interference. The DSP 312 can also be configured and arranged to provide AC power frequency detection 308. This detection can be accomplished by monitoring for zero crossing events of the AC. Mechanisms other than zero crossings can also be used (e.g., min-max detection or non-zero crossings). This detection 308 is used to produce a time base for the DSP network time 306.

SBC system time 318 is set according to UTC time provided from command center 112. The time base for the SBC system time 318 is a local oscillator 322, which can be provided using a crystal oscillator circuit. Communications with the command center are thereby accomplished using this SBC system time 318 as a reference point common to both devices. The SBC System Clock can be maintained by running Network Time Protocol (NTP) process that repeatedly connects to an NTP Time Server running on the command center 112.

SBC real time 320 is also set according to UTC time provided by command center 112. The time base for the SBC real time 320 is a local oscillator 324, which can be provided using a crystal oscillator circuit. In certain embodiments, the SBC real time 320 can continue to run in the absence of power (e.g., using a battery backup). The SBC real time 320 can be set/synchronized to the SBC System Clock during regularly scheduled updates (e.g., at the rate of once per hour). The SBC System Clock can then be set to the RTC at power on or reset.

SBC 316 can set the clocks in the DSP 312 using, for example, a time command that is sent at regular intervals (e.g., every five minutes). When SBC 316 determines that downstream packets are not present on the power line, it can be configured to stop sending time commands to the DSP 312. This can be particularly useful for helping to keep the DSP network time 306 in time alignment with the endpoints, e.g., by both the DSP 312 and the endpoints keeping time based upon the AC frequency.

DSP network time 306 is periodically updated according to the SBC system time 318, and between updates, it is maintained using the AC power frequency 308 as a time base. DSP system time 310 is also periodically updated according to the SBC system time 318; however, between updates it is maintained according to a local oscillator 314.

Certain embodiments of the present disclosure allow for multiple collectors to be co-located (e.g., in the same power substation). Each of the multiple collectors can independently set its clocks by having NTP clients running on the respective collector that communicate with the time server 208 running on the command center 112.

In other embodiments of the present disclosure, one of the collectors in a substation will run an NTP Server that communicates with the time server 208, and the other collectors in that substation can receive time updates from the collector running the NTP server. This can be particularly useful for reducing upstream traffic and/or for reducing the processing load and bandwidth necessary to implement the time server 208.

Consistent with certain embodiments, the collector 104 can be configured to maintain the DSP network time for all blades within a collector to within a set tolerance. For instance, this tolerance could be within +/−five milliseconds of one another.

While the terms single board computer and digital signal processor are used to describe embodiments of the collector 104a, the functionality of the collector 104a can be provided using various different types of circuits, including but not limited to, programmable logic, discrete logic circuits, specialized processing circuits and combinations thereof.

Figure 2C:
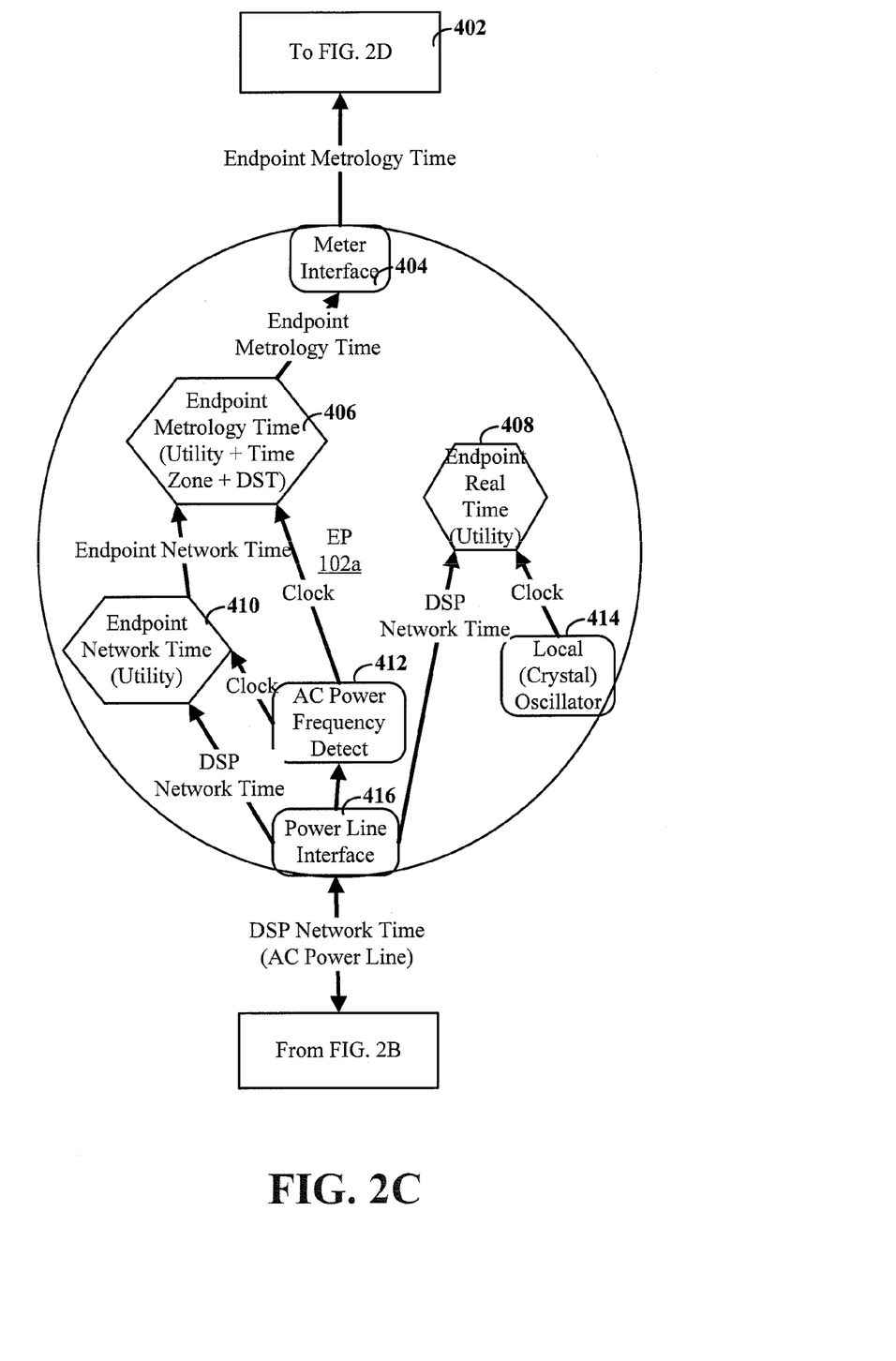
FIG. 2C depicts a time-based block diagram for an endpoint in the system, consistent with embodiments of the present disclosure.

FIG. 2C depicts a time-based block diagram for an endpoint in the system, consistent with embodiments of the present disclosure. Endpoint 102a is communicatively coupled to the collector 104a through the power distribution lines. A power line interface 416 provides an interface for receiving the communications and can also provide isolation from high voltages and/or provide filtering. AC power frequency detection 412 detects the frequency of the AC on the power distribution lines. Endpoint 102a is configured to receive downstream time packets from collector 104a. These time packets contain time information relative to DSP network time 306 and can be used to coordinate transmission and reception times over the power distribution lines.

Endpoint 102a shows three different times, endpoint network time 410, endpoint real time 408 and endpoint metrology time 406. Endpoint network time 410 is configured to be periodically updated in relation to the DSP network time 306 while using the AC power frequency 412 as a time base. Endpoint network time 410 can therefore be used to decode downstream data. In certain embodiments, the endpoint network time 410 can be set in response to a received downstream time packet and a subsequent symbol that indicates the updated implementation time. In some implementations, this symbol can be linked to a known time event, such as the beginning of every minute. Endpoint real time 408 can also be configured to be periodically updated in relation to the DSP network time 306; however, a local oscillator 414 can be used as the time base. Accordingly, the time represented by both endpoint network time 410 and endpoint real time 408 can be set relative to the time zone for the (utility company) operator of the system.

Endpoint metrology time 406 is synchronized to endpoint network time 410 and uses the AC power frequency 412 as a time base. The endpoint 102a, however, can be configured and arranged to also include time offsets in the endpoint network time 410. These offsets can include time zone offsets and, if applicable, DST offsets. The time zone and DST can be set according to the geographical location of the endpoint 102a and its associated meters. This can be particularly useful for utility companies that provide services in, and thus have endpoints located in, multiple time zones.

Consistent with certain embodiments of the present disclosure, endpoint metrology time 406 is compared against a time indicated in the downstream time packet. The differences between endpoint metrology time 406 and the time indicated in the packet is then compared against a threshold level (which can be fixed or programmable). Endpoint metrology time 406 is updated if the programmable threshold has been exceeded.

Meter interface 404 provides a communication connection point to one or more meters, as shown by block 402. The connection can be provided using a number of different protocols and mediums. The flexibility of this communication solution can be attributed, in part, due to the relative distance between the endpoint 102a and the meter 101a (e.g., as compared to distances of transmission from an endpoint 102a to a meter 101a). For instance, endpoint-to-meter communications may be capable of using wireless communications in the industrial, scientific and medical (ISM) frequencies if they are able to communicate while meeting the power restrictions placed upon devices using these frequencies. For instance, the meters and endpoints could form ad-hoc networks using wired and/or wireless communications. This connection-based solution could be implemented as a propriety solution or using industry standards (e.g., 802.11, 802.14 and/or Zigbee). For at least some of these solutions, the time-of-day/time-keeping functions of the devices can be separated from the communications protocols without undue consequences. Accordingly, the programmable threshold mentioned above could be several seconds (e.g., +/−30 seconds).

Figure 2D:
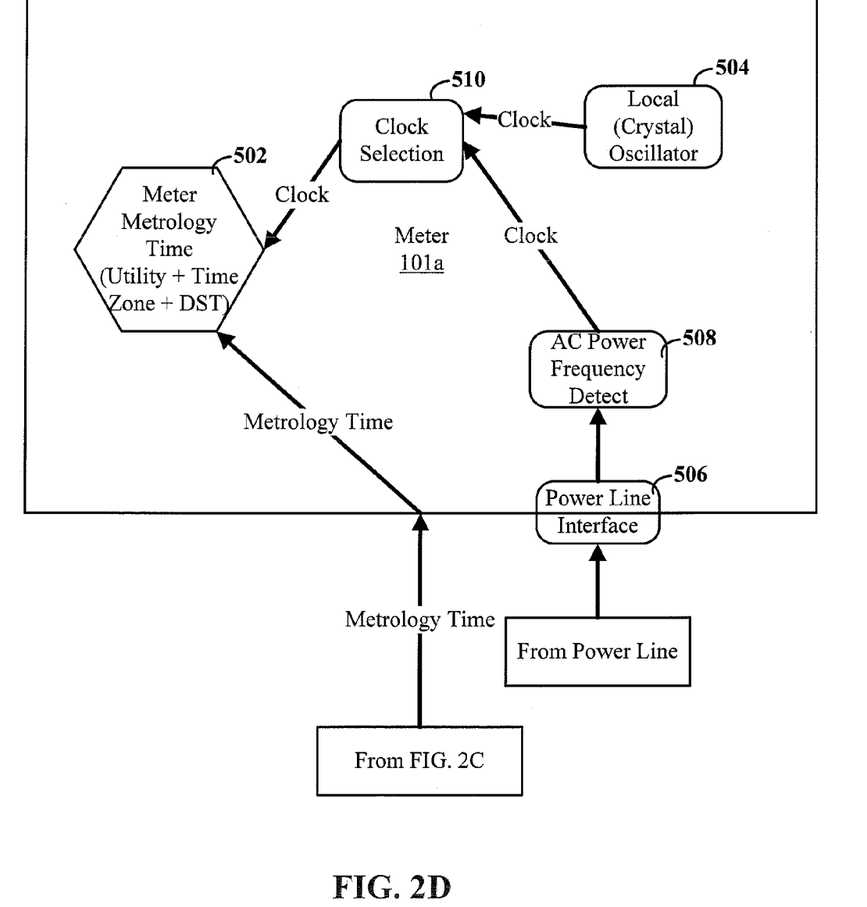
FIG. 2D depicts a time-based block diagram for a meter in the system, consistent with embodiments of the present disclosure.

FIG. 2D depicts a time-based block diagram for a meter in the system, consistent with embodiments of the present disclosure. Metrology time is received from the endpoint device 102a. This received metrology time is used to generate a meter metrology time 502, which can use a local oscillator 504 as a time base or the frequency of the AC power. For instance, a power line interface 506 can couple the AC power frequency detection module 508 with the AC power line. The AC power frequency detection module 508 can then provide the detected frequency to a clock selection module 510. Clock selection module 510 can then provide either the local oscillator 504 or the detected frequency for use as a time base.

The meter metrology time 502 can be checked/updated in response to one or more trigger events. These trigger events can include, but are not limited to, boot up of the meter (e.g., power on or reset), periodically (e.g., once per day), and/or in response to detecting a timing drift that exceeds a programmable threshold (e.g., 1 second).

Aspects of the present disclosure are directed toward handling time changes due to DST. A particular embodiment maintains a network time, used for transmission timings, independent of DST (e.g., DSP network time 306 and endpoint network time 410). A system also has the capability of maintaining a metrology time that does compensate for DST (e.g., endpoint metrology time 406 and meter metrology time 502). For instance, the system can configure an endpoint to respond (or not respond) to DST as part of downstream configuration data provided to the endpoint by the collector. The endpoint can determine that DST should be applied by monitoring received time packets for a DST indication/flag. If these flags are set, the metrology clock will increase by an amount of minutes indicated by a DST offset. DST offset may be set to a value that is positive, negative or even zero.

Embodiments of the present disclosure are directed toward the use of portable/handheld configuration devices. These portable configuration devices are designed to allow a service technician to configure/troubleshoot endpoint devices in the field by directly communicating with the endpoint (e.g., without using a collector and/or power line communications). This can be particularly useful for initial configuration, diagnostics and trouble shooting. The portable device can have a network time that uses a local oscillator for a time base. For instance, the portable device could be a laptop that is configured with software that is specially adapted to communication with endpoint devices. The portable device can synchronize its network time to UTC time through a link to the command center 112 (e.g., over the Internet). The portable device can then provide this UTC time to the endpoint device for its use therein.

The signals and associated logic and functionality described in connection with the figures can be implemented in a number of different manners. Unless otherwise indicated, various general purpose systems and/or logic circuitry may be used with programs in accordance with the teachings herein, or it may prove convenient to construct a more specialized apparatus to perform the required method. For example, according to the present disclosure, one or more of the methods can be implemented in hard-wired circuitry by programming a general-purpose processor, other fully or semi-programmable logic circuitry, and/or by a combination of such hardware and a general-purpose processor configured with software.

It is recognized that aspects of the disclosure can be practiced with computer/processor-based system configurations other than those expressly described herein. The required structure for a variety of these systems and circuits would be apparent from the intended application and the above description.

The various terms and techniques are used by those knowledgeable in the art to describe communications, protocols, applications, implementations, mechanisms, etc. One such technique is the description of an implementation of a technique expressed in terms of an algorithm or mathematical expression. That is, while the technique may be, for example, implemented as executing code on a computer, the expression of that technique may be more aptly and succinctly conveyed and communicated as a formula, algorithm, or mathematical expression.

Thus, it is recognized that a block denoting "C=A+B" as an additive function whose implementation in hardware and/or software would take two inputs (A and B) and produce a summation output (C), such as in combinatorial logic circuitry. Thus, the use of formula, algorithm, or mathematical expression as descriptions is to be understood as having a physical embodiment in at least hardware (such as a processor in which the techniques of the present disclosure may be practiced as well as implemented as an embodiment).

In certain embodiments, machine-executable instructions can be stored for execution in a manner consistent with one or more of the methods of the present disclosure. The instructions can be used to cause a general-purpose or special-purpose processor that is programmed with the instructions to perform the steps of the methods. Alternatively, the steps might be performed by specific hardware components that contain hardwired logic for performing the steps, or by any combination of programmed computer components and custom hardware components.

In some embodiments, aspects of the present disclosure may be provided as a computer program product, which may include a machine or computer-readable medium having stored thereon instructions which may be used to program a computer (or other electronic devices) to perform a process according to the present disclosure. Accordingly, the computer-readable medium includes any type of media/machine-readable medium suitable for storing electronic instructions.

The various embodiments described above are provided by way of illustration only and should not be construed to limit the disclosure. Based on the above discussion and illustrations, those skilled in the art will readily recognize that various modifications and changes may be made to the present disclosure without strictly following the exemplary embodiments and applications illustrated and described herein. For instance, such changes may include variations on mechanisms for synchronization with (and/or tracking of) the AC line frequency and/or the use of communication protocols that are not expressly mentioned. Such modifications and changes do not depart from the true spirit and scope of the present disclosure, which is set forth in the following claims.

What is claimed is:

1. A method for communicating time-based data in a power line communication system having a command center, a collector device and a plurality of endpoint devices, the method comprising:
    communicating, from the collector device, downstream data to a plurality of endpoint devices, the downstream data communication using a communication protocol that is relative to a collector network time and that is over a set of power distribution lines carrying alternating current (AC), the collector network time using a local oscillator as a time base; and
    for each endpoint device,
        communicating, from the endpoint device, upstream data to the collector device, the upstream data communication using a communication protocol that is relative to a corresponding endpoint network time and that is over the set of power distribution lines carrying alternating current (AC), the endpoint network time using the AC as a time base, wherein the upstream data is time-sensitive relative to a location-based time that is dependent on a geographic location of the endpoint device, that uses the AC as a time base and that is offset relative to the endpoint network time; and
        adjusting and synchronizing the collector network time and the endpoint network time according to a network time derived from a time server: (i) to facilitate system-wide downstream data communication over the set of power distribution lines and (ii) to track, via upstream data communication over the set of power distribution lines, with time-based events reported relative to the location-based times used by the endpoint devices.

2. The method of claim 1, wherein the communication protocols for each of the downstream data and the upstream data use symbol transmission intervals that are adjusted and synchronized relative to a corresponding network time.

3. The method of claim 1, further including steps of synchronizing the network time to a Coordinated Universal Time (UTC) and offsetting the location-based time relative to the UTC as a function of the geographic location of a corresponding endpoint device.

4. The method of claim 1, further including steps of synchronizing the network time to a standardized time and offsetting the location-based time relative to the standardized time as a function of time zones and regional time-keeping plans associated with a corresponding endpoint device.

5. The method of claim 1, further including a step of maintaining synchronicity between the collector network time and the endpoint network time to within an offset of 150 milliseconds or less and wherein the communication protocol for the downstream data use one of quadrature phase-shift keying, amplitude shift keying, differential phase-shift keying and frequency-shift keying that is communicated using the respective network time as a timing reference.

6. The method of claim 1, further including a step of, at one or more of the endpoints, performing offset compensation between endpoint network time and location-based time and therefrom communicating with the collector device using endpoint network time as a timing reference and communicating with one or more utility meters using the location-based time as a timing reference.

7. The method of claim 1, wherein the location-based time differs from the endpoint network time by one or more of time zones and regional time-keeping plans associated with a corresponding endpoint device.

8. The method of claim 1, further comprising:
    maintaining synchronicity between each of the plurality of endpoint devices and a plurality of collectors, including the collector device, for each of:
        a collector network time that is based upon a crystal oscillator as a time reference;
        the endpoint network time that is based upon a frequency of the AC power carried over power distribution lines, and
        a metrological time that is based upon the frequency of the AC power carried over power distribution lines as a time reference and that, for one or more of the endpoint devices, is offset from the endpoint network time by one or more of daylight savings time and a time zone; and
    communicating meter usage data over the power distribution lines using a communication protocol that uses the endpoint network time as a timing reference point for transmission of the meter usage data and the metrological time for associating billing data with the meter usage data.

9. The method of claim 8, further including a step of broadcasting time packets from a collector to multiple ones of the plurality of endpoint devices, wherein transmission of a subsequent symbol is set to coincide with a time indicated by a data value in the time packet.

10. The method of claim 8, further including a step of synchronizing collector network times for the collectors by receiving synchronization information from a common time server.

11. The method of claim 8, further including a step of maintaining a local system time at each of the endpoints, wherein the endpoint network time uses a frequency of the AC power as a time reference.

12. The method of claim 8, further including a step of maintaining synchronicity between the metrological time of an endpoint of the plurality of endpoints and a metrological time of a utility meter, wherein the metrological time of the utility meter is adjusted in response to a time difference exceeding a threshold time.

13. A utility reporting system comprising:
a plurality of endpoints, each endpoint configured and arranged to
maintain local metrological time in response to timing data received over power distribution lines by adjusting a local clock and by adding timing offsets for one or more of time zones and daylight savings;
receive utility usage data from utility meters;
tag the utility usage data with the local metrological time;
maintain an endpoint network time using a frequency of AC power carried on the power distribution lines as a timing reference;
transmit the tagged utility usage data over the power distribution lines using the endpoint network time as a reference for timing the transmission of data carrying symbols;
a collector including a plurality of blades, each blade configured and arranged to
maintain a collector network time using a local oscillator circuit as a timing reference;
adjust the collector network time in response to timing data received from a time server;
transmit, over the power distribution lines, the maintained collector network time to one or more of the plurality of endpoints;
receive, over the power distribution lines, a signal modulated to include the data carrying symbols and to represent the tagged utility usage data; and
demodulate the modulated signal using the collector network time as a reference for identifying the data carrying symbols.

14. A method comprising:
receiving a signal carried on a power distribution line;
decoding the signal to generate data;
extracting time-of-day information from the generated data;
detecting a start symbol in the signal; and
setting, in response to detecting the start symbol, a network time to a time corresponding to the extracted time-of-day information.

15. The method of claim 14, wherein the power distribution line provides alternating current (AC) power.

16. The method of claim 14, further including steps of detecting a daylight savings flag in the extracted time of day information and in response to detecting the presence, generating time data by adding an offset to the network time.

17. An apparatus comprising:
a transceiver circuit configured and arranged to receive and transmit signals carried on a power distribution line;
a processing circuit configured and arranged to
receive a signal carried on the power distribution line;
decode the signal to generate data;
extract time-of-day information from the generated data;
detect a start symbol in the signal; and
set, in response to detecting the start symbol, a network time to a time indicated by the extracted time-of-day information.

18. The apparatus of claim 17, wherein the transceiver circuit includes a power line coupling circuit providing protection from at least 100 Volts.

19. The apparatus of claim 17, wherein the processing circuit is configured and arranged to receive a signal wherein the signal is a broadcast message directed at additional transceiver circuits.

20. An apparatus for communicating time-based data in a power line communication system having a command center, a collector device and a plurality of endpoint devices, the apparatus comprising:
means for communicating, from the collector device, downstream data to a plurality of endpoint devices, the downstream data communication using a communication protocol that is relative to a collector network time and that is over a set of power distribution lines carrying alternating current (AC), the collector network time using a local oscillator as a time base; and
for each endpoint device,
means for communicating, from the endpoint device, upstream data to the collector device, the upstream data communication using a communication protocol that is relative to a corresponding endpoint network time and that is over the set of power distribution lines carrying alternating current (AC), the endpoint network time using the AC as a time base, wherein the upstream data is time-sensitive relative to a location-based time that is dependent on a geographic location of the endpoint device, that uses the AC as a time base and that is offset relative to the endpoint network time; and
means for adjusting and synchronizing the collector network time and the endpoint network time according to a network time derived from a time server: (i) to facilitate system-wide downstream data communication over the set of power distribution lines and (ii) to track, via upstream data communication over the set of power distribution lines, with time-based events reported relative to the location-based times used by the endpoint devices.

* * * * *